United States Patent
Qiu et al.

(10) Patent No.: US 8,724,265 B2
(45) Date of Patent: May 13, 2014

(54) TRAPEZOIDAL BACK BIAS AND TRILAYER READER GEOMETRY WITH PREDETERMINED MAGNETIZATION SHAPE

(71) Applicant: Seagate Technology LLC, Scotts Valley, CA (US)

(72) Inventors: Jiaoming Qiu, Saint Paul, MN (US); Kaizhong Gao, Shoreview, MN (US); Yonghua Chen, Edina, MN (US); Beverley Craig, Culmore (IE); Zhongyan Wang, San Ramon, CA (US); Vladyslav A. Vas'ko, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 13/743,607

(22) Filed: Jan. 17, 2013

(65) Prior Publication Data

US 2013/0128390 A1    May 23, 2013

Related U.S. Application Data

(62) Division of application No. 12/502,104, filed on Jul. 13, 2009, now abandoned.

(51) Int. Cl.
G11B 5/33    (2006.01)
G11B 5/127    (2006.01)

(52) U.S. Cl.
USPC .................................. 360/324.12; 360/327.31

(58) Field of Classification Search
USPC ......... 360/324.11, 324.12, 319, 327.1, 327.2, 360/327.23, 327.31
See application file for complete search history.

(56) References Cited

U.S. PATENT DOCUMENTS

| | | | |
|---|---|---|---|
| 5,576,914 A | 11/1996 | Rottmayer et al. |
| 5,739,987 A | 4/1998 | Yuan et al. |
| 5,835,314 A | 11/1998 | Moodera et al. |
| 5,880,910 A | 3/1999 | Shouji et al. |
| 6,282,068 B1 | 8/2001 | Pinarbasi |
| 6,353,316 B1 | 3/2002 | Amano |
| 6,556,388 B1 | 4/2003 | Everitt et al. |
| 6,724,583 B2 | 4/2004 | Seigler et al. |
| 6,735,062 B1 | 5/2004 | Pokhil et al. |
| 6,735,850 B1 | 5/2004 | Gibbons et al. |
| 6,775,111 B2 | 8/2004 | Lin et al. |
| 6,930,865 B2 | 8/2005 | Ghaly et al. |
| 6,987,652 B2 | 1/2006 | Koganei |
| 7,177,122 B2 | 2/2007 | Hou et al. |
| 7,570,461 B2 | 8/2009 | Sapozhnikov |

(Continued)

OTHER PUBLICATIONS

Li, Jian and Rau, Carl, "Magnetic domain structures of focused ion beam-patterned cobalt films using scanning ion microscopy with polarization analysis," Journal of Applied Physics, vol. 95, No. 11, pp. 6527-6529, American Institute of Physics, 2004.

*Primary Examiner* — Brian Miller
(74) *Attorney, Agent, or Firm* — Hall Estill Attorneys at Law (57) ABSTRACT

A magnetoresistive sensor is generally disclosed. Various embodiments of a sensor can have at least a trilayer sensor stack biased with a back biasing magnet adjacent a back of the trilayer sensor. The back biasing magnet, the trilayer sensor stack, or both have substantially trapezoidal shapes to enhance the biasing field and to minimize noise.

20 Claims, 7 Drawing Sheets

(56) References Cited

U.S. PATENT DOCUMENTS

| | | |
|---|---|---|
| 7,656,700 B2 | 2/2010 | Seigler |
| 8,582,250 B2 * | 11/2013 | Qiu et al. ............ 360/324.12 |
| 2002/0114111 A1 | 8/2002 | Zhu |
| 2002/0126428 A1 | 9/2002 | Gill |
| 2002/0191348 A1 | 12/2002 | Hasegawa et al. |
| 2003/0179515 A1 | 9/2003 | Pinarbasi |
| 2003/0214764 A1 | 11/2003 | Sapozhnikov et al. |
| 2005/0088789 A1 | 4/2005 | Hou et al. |
| 2006/0256485 A1 | 11/2006 | Seigler et al. |
| 2008/0182133 A1 * | 7/2008 | Shiimoto et al. ............ 428/811.2 |
| 2009/0034132 A1 | 2/2009 | Miyauchi et al. |
| 2011/0050211 A1 * | 3/2011 | Gao et al. ............ 324/207.21 |
| 2011/0051294 A1 * | 3/2011 | Gao et al. ............ 360/313 |

* cited by examiner

TRAPEZOIDAL BACK BIAS AND TRILAYER READER GEOMETRY WITH PREDETERMINED MAGNETIZATION SHAPE

RELATED APPLICATION

This application is a divisional application of copending U.S. patent application Ser. No. 12/502,104 filed on Jul. 13, 2009.

SUMMARY

A magnetoresistive sensor includes at least a trilayer sensor stack with a front width proximate an ABS, and a back width distal from an ABS and a back biasing magnet with a trapezoidal shape with a front width and a back width. The trapezoidal shape concentrates the magnetic field at the front of the biasing magnet in the vicinity of the sensor stack.

BRIEF DESCRIPTION OF THE DRAWINGS

FIGS. 9A-9K illustrate the fabrication steps to produce the read head illustrated in FIGS. 5 and 6.

DETAILED DESCRIPTION

Figure 1A:
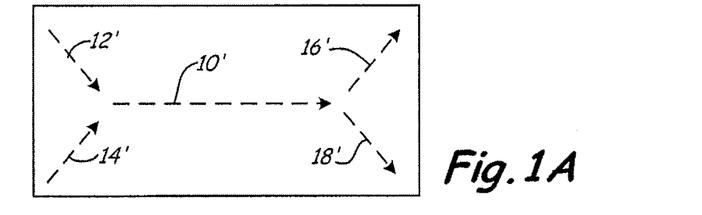
FIG. 1A is a schematic diagram showing micromagnetic magnetization patterns in a rectangular sample.
Figure 1B:
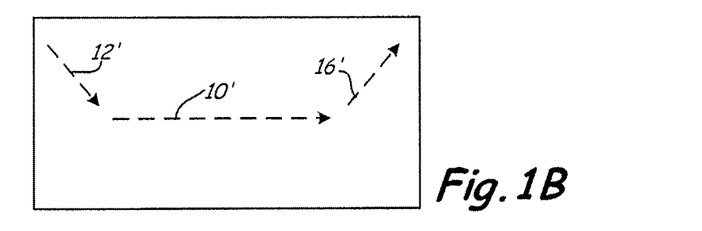
FIG. 1B is a schematic diagram showing a "C" type micromagnetic magnetization pattern in the sample of FIG. 1A.
Figure 1C:
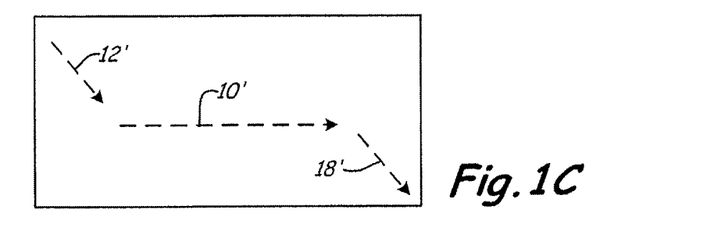
FIG. 1C is a schematic diagram showing an "S" type micromagnetic magnetization pattern in the sample of FIG. 1A.

The various embodiments of shapes disclosed herein increase the performance of a reader by increasing the bias field at the front of a back bias magnet and by decreasing signal noise. The origin of these effects is shown in FIGS. 1A-1C. FIG. 1A illustrates possible micromagnetic magnetization patterns in a rectangular magnetic sample under a magnetization oriented generally from the left to right. Magnetization vectors 12' and 14' originate at the corners of the sample and are directed to the center where they converge at magnetization vector 10'. Magnetization vector 10' diverges into vectors 16' and 18' as it approaches the right side of the sample. FIG. 1 shows all possible micromagnetic magnetization patterns. Two patterns are energetically favored. FIG. 1B illustrates a "C" pattern comprised of vectors 12', 10' and 16'. An alternative "C" pattern comprises vectors 14', 10' and 18'. FIG. 1C illustrates an "S" pattern comprised of vectors 12', 10' and 18' or alternatively vectors 14', 10' and 16'. The energy difference between the "C" state and the "S" state is very small and during magnetic switching, thermally activated transitions between both patterns contribute to measurable sensor noise.

Figure 1D:
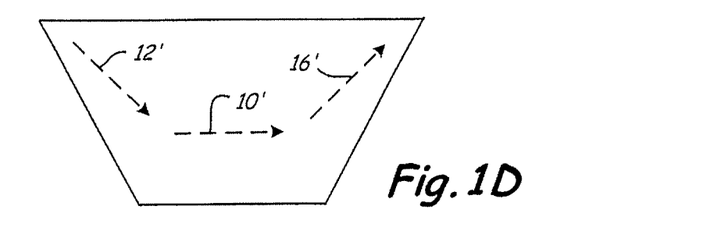
FIG. 1D is a schematic showing a "C" type micromagnetic magnetization pattern in a trapezoidal sample.

By changing the geometry of a magnetic element, one or the other of the "C" and "S" states can be energetically favored. FIG. 1D illustrates how the "C" state can be favored by a trapezoidal shape of the micromagnetic element. This shape will be used in what follows to tailor magnetization in the back bias permanent magnet of a trilayer reader as well as in the freelayers of the reader itself. Although trapezoidal geometries are discussed herein to favor "C" shape micromagnetic magnetization patterns, it should be noted that other geometries such as half moon shapes can be used to obtain similar beneficial results.

Figure 2:
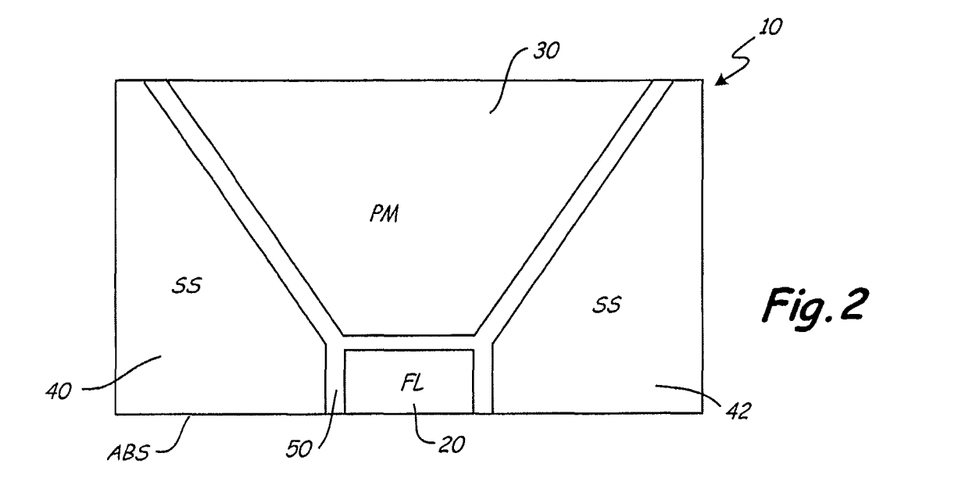
FIG. 2 is a top view of a first example of a read head in accord with the present invention.
Figure 3:
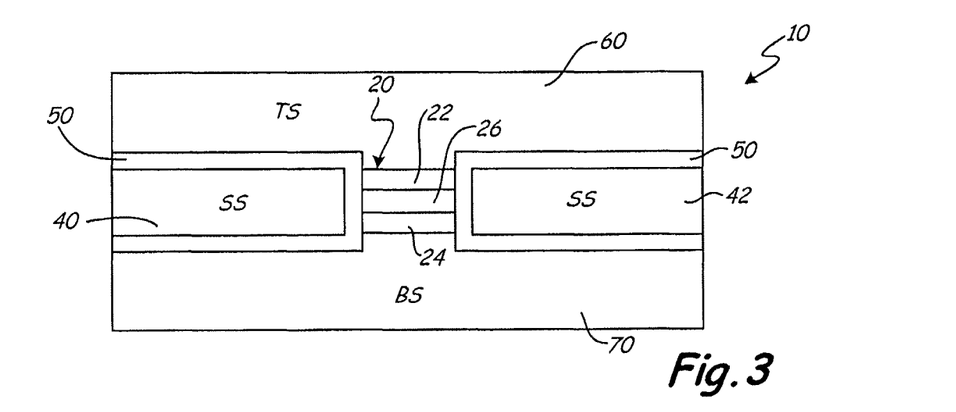
FIG. 3 is an ABS view of the read head in FIG. 2 in accord with the present invention.

FIGS. 2 and 3 illustrate one non-limiting aspect of an example trilayer reader. FIG. 2 is a top view of an embodiment of the trilayer read head 10, and FIG. 3 is an ABS view of read head 10. Read head 10 comprises rectangular trilayer reader stack 20 (comprising ferromagnetic freelayers 22 and 24 and spacer layer 26) in front of trapezoidal back bias magnet 30. Magnetic side shields 40 and 42 abut both sides of bias magnet 30 and trilayer reader stack 20. Trilayer reader stack 20, bias magnet 30, and side shields 40 and 42 are separated from each other by insulating layer 50. Side shields 40 and 42 may also be replaced by an insulator preferably an oxide of aluminum.

The ABS view of trilayer read head 10 in FIG. 3 shows top shield 60, bottom shield 70 and side shields 40 and 42 adjacent trilayer reader stack 20 and insulator layer 50. Ferromagnetic freelayers 22 and 24 of trilayer reader stack 20 are separated by spacer layer 26. If spacer layer 26 is a nonmagnetic electrical conductor, read head 10 is a GMR head. If spacer layer 26 is a nonmagnetic electrical insulator, read head 10 is a TGMR head. Read head 10 can be a current perpendicular to plane (CPP) head wherein electrical contact is made to trilayer reader stack 20 through top shield 60 and bottom shield 70.

If spacer layer 26 is nonmagnetic, and electrically conducting, it may be fabricated from, for example, copper. If spacer layer 26 is nonconducting, it may be fabricated from, for example, aluminum oxide ($Al_2O_3$ or $Al_xO$ where x may or may not be an integer) or magnesium oxide. Ferromagnetic layers 22 and 24 may be fabricated from magnetic material such as, for example, nickel-iron-cobalt (Ni—Fe—Co) compositions. The shield layers may be fabricated from, for example, a soft magnetic material such as nickel-iron (Ni—Fe). Back bias magnet 30 may be fabricated from a permanent magnet material such as, for example, a cobalt-platinum (Co—Pt) alloy.

Figure 4A:
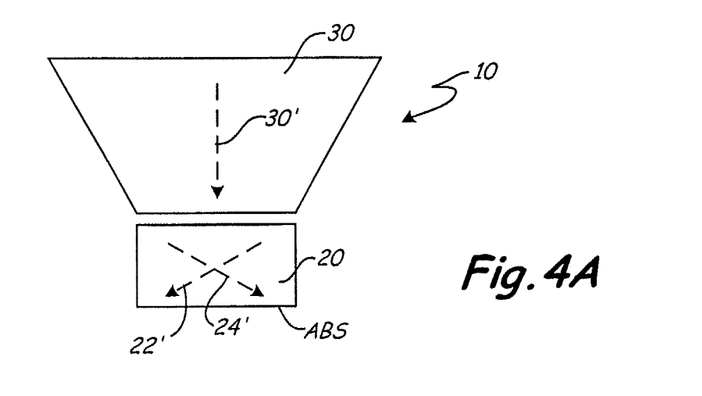
FIG. 4A is a schematic top view of the trilayer sensor in FIG. 2 showing biasing in the absence of external bit flux.
Figure 4B:
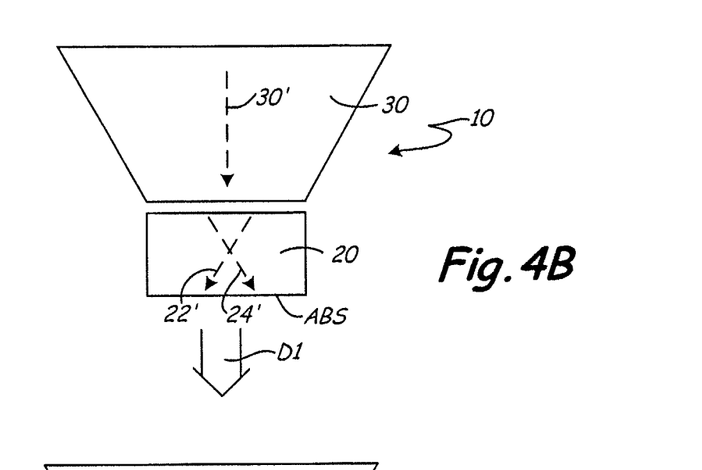
FIG. 4B is a schematic top view of the trilayer sensor in FIG. 4A under the influence of a first state of data.
Figure 4C:
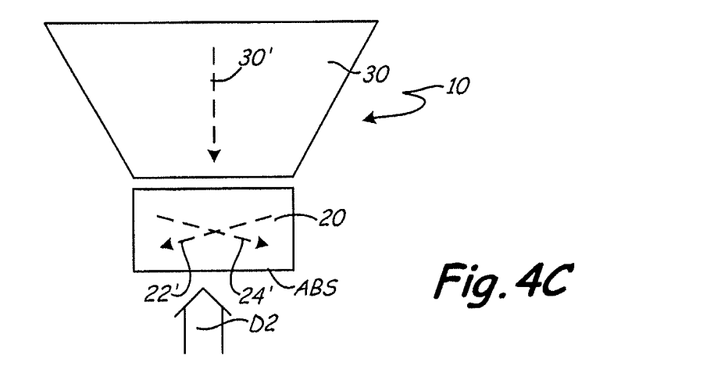
FIG. 4C is a schematic top view of the trilayer sensor in FIG. 4A under the influence of a second state of data.

The operation of read head 10, according to one aspect of the invention is described in conjunction with FIGS. 4A-4C. FIGS. 4A, 4B and 4C show top views of read head 10 with magnetization vector 30' of back bias layer 30 oriented with respect to magnetization vectors 22' and 24' of freelayers 22 and 24 to achieve optimum response of freelayers 22 and 24 to external magnetic fields. In the absence of back bias magnetization, freelayer magnetization vectors 22' and 24' would be antiparallel and commonly parallel to the ABS. Under the bias of magnetization vector 30', they arrange in a scissor orientation for optimum sensitivity. One benefit of the trapezoidal shape of back bias magnet 30 is that the smaller base near the back of trilayer reader stack 20 results in magnetic flux concentration in that region resulting in deeper penetration of the biasing field into reader stack 20 in the direction of the ABS.

FIGS. 4A-4C illustrate an example effect of varying bit magnetization on recorded media on the magnetization directions 22' and 24' of first freelayer 22 and second freelayer 24 respectively. FIG. 4A shows an example trilayer reader stack 10 in a quiescent magnetic state when it is not under the influence of magnetic flux emanating from recording media. The angle of magnetization between first ferromagnetic freelayer 22 and second ferromagnetic freelayer 24 at the ABS is in a scissors relation for optimum sensor response. FIG. 4B is a top view of an embodiment of the read head 10 showing trilayer reader stack 20 under the influence of a first state of data D1 corresponding to a positive bit. This first state of data causes the angle of magnetization between first freelayer 22 and second freelayer 24 to increase at the ABS. When this occurs, the resistance across trilayer reader stack 20 changes and is detected when a sense current is passed through trilayer reader stack 20. FIG. 4C is a top view of an example read head 10 showing trilayer reader stack 20 under the influence of a second state of data D2 corresponding to a negative bit. This second state of data causes the angle of magnetization between first freelayer 22 and second freelayer 24 to decrease at the ABS. As with the first state of data, the second state of data causes a change in resistance across trilayer reader stack 20 and is detected when a sense current is passed through trilayer reader stack 20.

Figure 5:
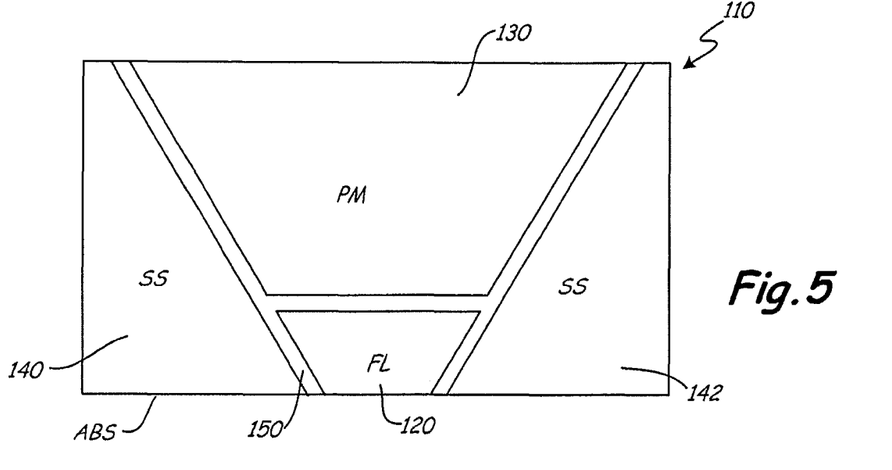
FIG. 5 is a top view of a second example of a read head in accord with the present invention.
Figure 6:
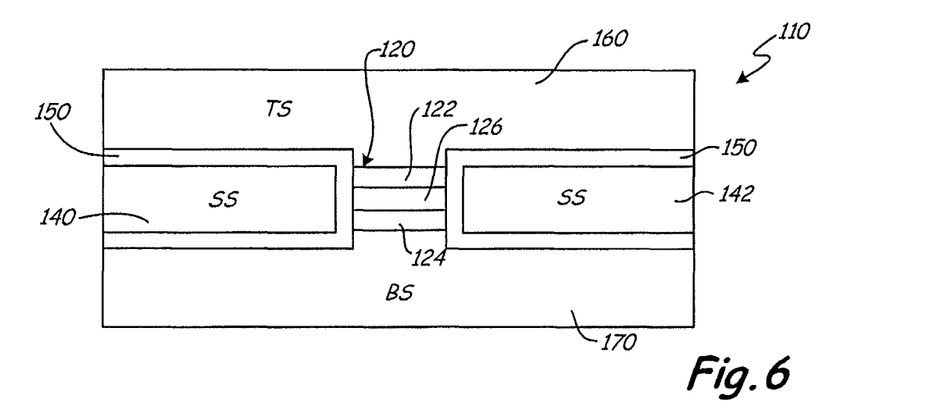
FIG. 6 is an ABS view of the read head in FIG. 5 in accord with the present invention.

FIGS. 5 and 6 illustrate another non-limiting embodiment. FIG. 5 is a top view of trilayer reader head 110, and FIG. 6 is an ABS view of read head 110. Read head 110 comprises trapezoidal trilayer reader stack 120 comprising ferromagnetic freelayers 122 and 124 and spacer layer 126 in front of trapezoidal back bias magnet 130. Magnetic side shields 140 and 142 are adjacent both sides of back bias magnet 130 and freelayer stack 120. Trilayer reader stack 120, back bias magnet 130, and side shields 140 and 142 are separated from each other by insulating layer 150. Side shields 140 and 142 may also be replaced by an insulator, preferably an oxide of aluminum. In this aspect of the invention, trilayer reader stack 120 has a trapezoidal shape. A benefit of the trapezoidal shape is that a "C" pattern of micromagnetic magnetization in reader stack 120 is preferred. The ABS view of trilayer read head 110 in FIG. 6 shows top shield 160, bottom shield 170 and side shields 140 and 142 adjacent trilayer reader stack 120 and insulator layer 150. Ferromagnetic freelayers 122 and 124 of trilayer reader stack 120 are separated by spacer layer 126. If spacer layer 126 is nonmagnetic, read head 110 is a GMR head. If spacer layer 126 is an insulator, read head 110 is a TGMR head. Read head 110 can be a current perpendicular to plane (CPP) head wherein electrical contact is made to trilayer reader stack 120 through top shield 160 and bottom shield 170.

If spacer layer 126 is nonmagnetic and electrically conducting, it may be fabricated from, for example, copper. If spacer layer 126 is nonconducting, it may be fabricated from, for example, aluminum oxide ($Al_2O_3$ or $Al_xO$ where x may be not be an integer) or magnesium oxide. Ferromagnetic layers 122 and 124 may be fabricated from magnetic materials, such as, for example, nickel-iron-cobalt (Ni—Fe—Co) compositions. The shield layers may be fabricated from, for example, a soft magnetic material such as nickel-iron (Ni—Fe). Back bias magnet 130 may be fabricated from a permanent magnet material such as, for example, a cobalt-platinum (Co—Pt) alloy.

Figure 7A:
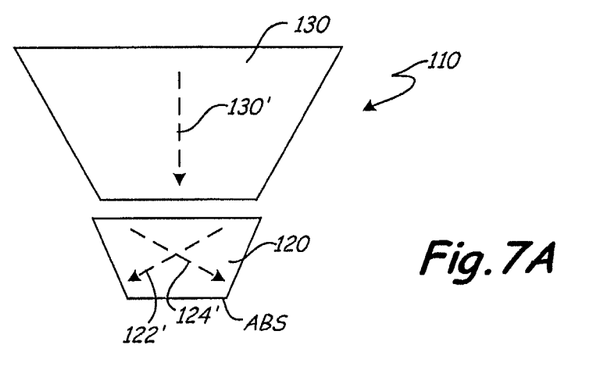
FIG. 7A is a schematic top view of the trilayer sensor in FIG. 5 showing biasing in the absence of external bit flux.
Figure 7B:
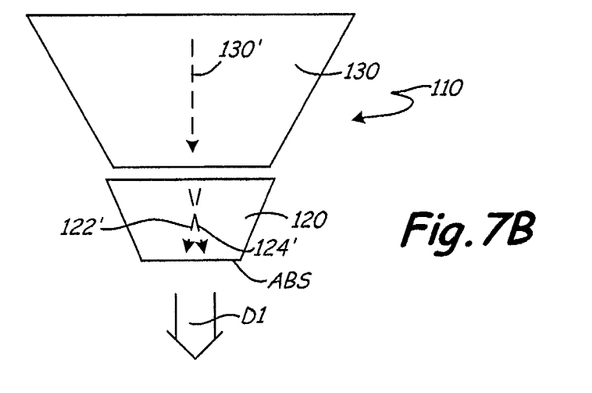
FIG. 7B is a schematic top view of the trilayer sensor in FIG. 7A under the influence of a first state of data.
Figure 7C:
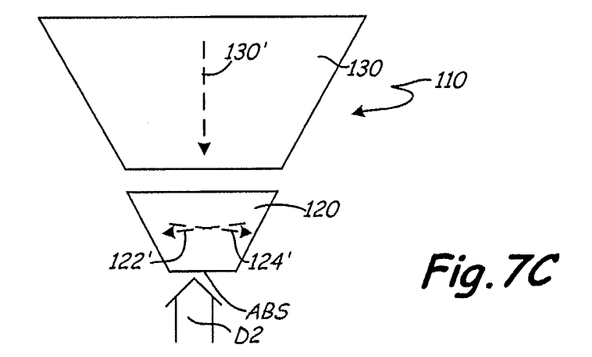
FIG. 7C is a schematic top view of the trilayer sensor in FIG. 7A under the influence of a second state of data.

The operation of read head 110 according to one embodiment is described in conjunction with FIGS. 7A-7C. FIGS. 7A, 7B and 7C show top views of read head 110 with magnetization vector 130' of back bias layer 130 oriented with respect to magnetization vectors 122' and 124' of freelayers 122 and 124 to achieve optimum response of freelayers 122 and 124 to external magnetic fields. In the absence of back bias magnetization 130', freelayer magnetization vectors 122' and 124' would be antiparallel and parallel to ABS 160. Under the back bias of magnetization 130', they arrange in a scissor orientation for optimum sensitivity. A benefit of the trapezoidal shape of back bias magnet 130 is that the smaller base at trilayer reader stack 120 results in magnetic flux concentration in that region resulting in deeper penetration of the biasing field into reader stack 120 in the direction of the ABS.

FIGS. 7A-7C illustrate the effect of varying bit magnetizations on recorded media on the magnetization directions 122' and 124' of first freelayer 122 and second freelayer 124 respectively. FIG. 7A shows trilayer reader stack 120 in a quiescent magnetic state when it is not under the influence of magnetic flux emanating from recording media. The angle of magnetization between first ferromagnetic freelayer 122 and second ferromagnetic freelayer 124 at the ABS is in a scissors relation for optimum sensor response. FIG. 7B is a front view of read head 110 showing trilayer reader stack 120 under the influence of a first state of data D1 corresponding to a positive bit. This first state of data causes the angle of magnetization between first freelayer 122' and second freelayer 124' to increase at the ABS. When this occurs, the resistance across trilayer reader stack 120 changes and is detected when a sense current is passed through trilayer reader stack 120. FIG. 7C is a top view of read head 110 showing trilayer reader stack 120 under the influence of a second state of data D2 corresponding to a negative bit. This second state of data causes the angle of magnetization between first freelayer 122' and second freelayer 124' to decrease at the ABS. As with the first state of data, the second state of data causes a change in resistance across trilayer reader stack 120 and is detected when a sense current is passed through trilayer reader stack 120.

The operation of read head 110 is similar to that discussed for read head 10 and schematically illustrated in FIG. 4A-4C, with one exception. The trapezoidal shape of trilayer reader stack 120 encourages a "C" type of micromagnetic magnetization in freelayers 124 and 126. This forces the magnetization vectors into orientations parallel to the ABS and discourages the formation of "S" type micromagnetic magnetization patterns in the freelayers, thereby minimizing noise resulting from "C" type to "S" type switching behavior during operation.

Figure 8A:
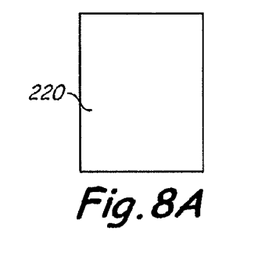
FIGS. 8A-8K illustrate the fabrication steps to produce the read head illustrated in FIGS. 2 and 3.
Figure 8B:
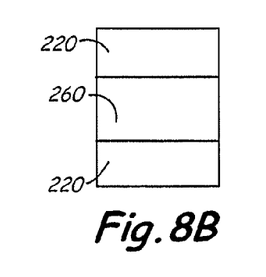
Figure 8C:
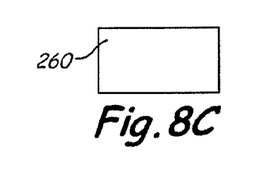
Figure 8D:
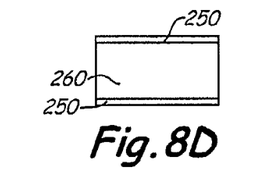
Figure 8E:
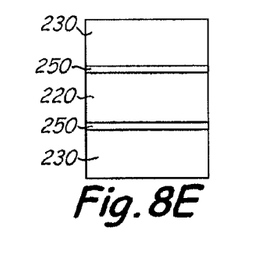
Figure 8F:
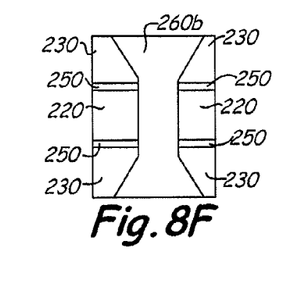
Figure 8G:
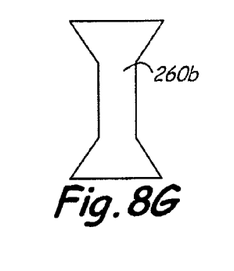
Figure 8H:
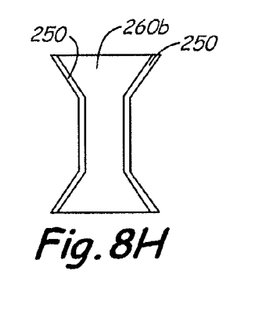
Figure 8I:
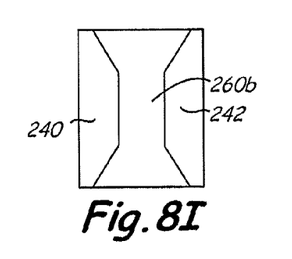
Figure 8J:
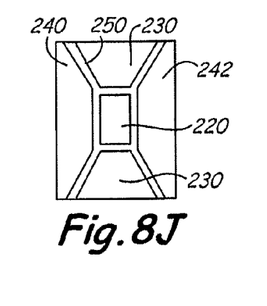
Figure 8K:
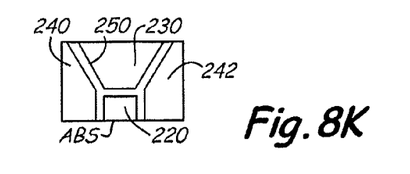

The formation of reader 10 with trapezoidal back bias magnet 30 shown in FIGS. 2 and 3 is schematically illustrated in FIGS. 8A-8K. FIG. 8A shows a substrate coated with reader stack 220. The reader stack can be a GMR or a TGMR stack. In the next step, photoresist (PR) layer 260, covering the center portion of reader stack 220, is deposited as shown in FIG. 8B. In the next step, shown in FIG. 8C, exposed reader stack 220 has been removed by ion beam machining or etching or by other means known in the art. Following removal of exposed reader stack 220, insulating layer 250 is deposited on each side of reader stack 220 and PR layer 260 as shown in FIG. 8D. Insulating layer 250, as mentioned earlier, is preferably aluminum oxide and is preferably deposited by atomic layer deposition (ALD). In the next step permanent bias magnet 230 is then deposited as shown in FIG. 8E comprising reader stack 220 with bias magnets 230 above and below reader stack 220 separated from reader stack 220 by insulating layers 250. The structure in FIG. 8E is then covered with PR layer 260b with a narrow center width and wider ends as shown in FIG. 8F. The exposed structure not covered with PR layer 260b is then removed by ion beam machining or etching or other means known in the art as shown in FIG. 8G. Insulator layer 250 is then deposited on each side of the structure covered with PR layer 260b as shown in FIG. 8H. Side shields 240 and 242 are deposited to form the structure shown in FIG. 8I. Side shields 240 and 242 could be replaced with insulator layer 250 if needed. Removing PR layer 260b in FIG. 8I reveals the structure shown in FIG. 8J comprising rectangular reader stack 220 separated from side shields 240 and 242 and trapezoidal bias magnets 230 by insulating layer 250. Masking the top half of the structure shown in FIG. 8J and removing the remainder creates reader structure 10 shown in FIG. 8K comprising rectangular reader stack 220, side shields 240 and 242 and trapezoidal back bias magnet 230 separated from each other by insulating layer 250. Air bearing surface ABS is indicated in FIG. 8K.

Figure 9A:
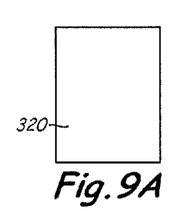
Figure 9B:
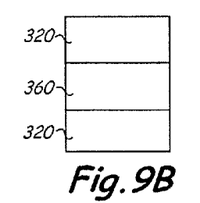
Figure 9C:
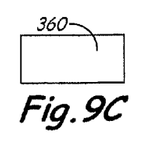
Figure 9D:
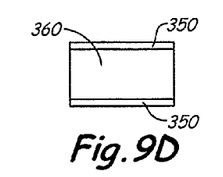
Figure 9E:
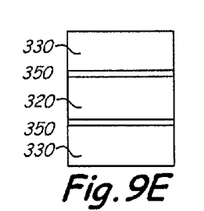
Figure 9F:
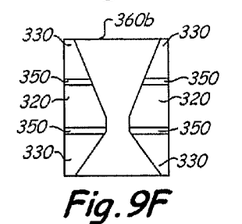
Figure 9G:
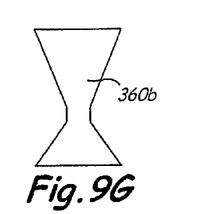
Figure 9H:
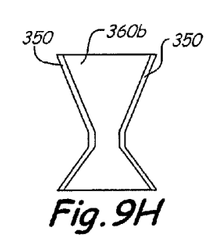
Figure 9I:
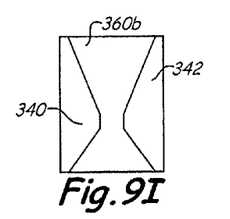
Figure 9J:
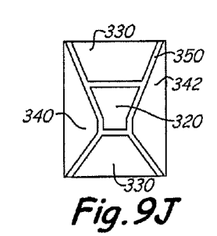

The formation of reader 110 with trapezoidal back bias magnet 130 and trapezoidal reader stack 120 shown in FIGS. 5 and 6 is schematically illustrated in FIGS. 9A-9K. FIG. 9A shows a substrate coated with reader stack 320. The reader stack can be a GMR or a TGMR stack. Photoresist (PR) layer 360, covering the center portion of reader stack 320, is deposited as shown in FIG. 9B. In the next step, shown in FIG. 9C, exposed reader stack 320 has been removed by ion beam machining or etching or by other means known in the art. Following removal of exposed reader stack 320, insulating layer 350 is deposited on each side of reader stack 320 and PR layer 360 as shown in FIG. 9D. Insulating layer 350, as mentioned earlier, is preferably aluminum oxide and is preferably deposited by atomic layer deposition (ALD). In the next step, permanent bias magnet 330 is then deposited as shown in FIG. 9E comprising reader stack 320 with bias magnets 330 above and below reader stack 320 separated from reader stack 320 by insulating layer 350. The structure in FIG. 9E is then covered with PR layer 360b with a narrow center width and asymmetrically wider ends as shown in FIG. 9H. The exposed structure not covered with PR layer 360b is then removed by ion beam machining or etching or other means known to produce the structure shown in FIG. 9G. Insulator layer 350 is then deposited on each side of the structure in FIG. 9G to produce the structure shown in FIG. 9H. Side shields 340 and 342 are deposited on each side to form the structure shown in FIG. 9I. Side shields 340 and 342 could be replaced with insulator layer 350 if needed. Removing PR layer 360b in FIG. 9K reveals the structure shown in FIG. 9J comprising trapezoidal reader stack 320, side shields 340 and 342 and trapezoidal bias magnet 330. All are separated by insulating layer 350. Masking the top half of the structure shown in FIG. 9J and removing the remainder creates reader structure 110 shown in FIG. 9K comprising trapezoidal trilayer reader stack 320, side shields 340 and 342, and trapezoidal back bias magnet 330 separated from each other by insulating layer 350. Air bearing surface ABS is indicated in FIG. 9K.

While the present disclosure has been described with reference to an exemplary embodiment(s), it will be understood by those skilled in the art that various changes may be made and equivalents may be substituted for elements thereof without departing from the scope of the technology. In addition, many modifications may be made to adapt a particular situation or material to the teachings of the disclosure without departing from the essential scope thereof. Therefore, it is intended that the provided technology not be limited to the particular embodiment(s) disclosed, but will include all embodiments falling within the scope of the appended claims.

What is claimed is:

1. A magnetic sensor comprising a trilayer stack disposed between an air bearing surface (ABS) and a back biasing magnet, the back biasing magnet and trilayer stack each shaped substantially as trapezoids along a plane extending from a first side shield to a second side shield and perpendicular from the ABS to provide a predetermined micromagnetic magnetization shape in the trilayer stack.

2. The magnetic sensor of claim 1, wherein the back bias magnet has a magnet width, as measured parallel to the ABS, that reduces as it approaches the ABS.

3. The magnetic sensor of claim 2, wherein the trilayer stack has a stack width, as measure parallel to the ABS, that reduces as it approaches the ABS.

4. The magnetic sensor of claim 1, wherein the trilayer stack has a pair of stack sidewalls extending from the ABS at a first predetermined angle and the back biasing magnet has a pair of magnet sidewalls extending away from the ABS at a second predetermined angle, the first and second angles being the same.

5. The magnetic sensor of claim 1, wherein the trilayer stack has a pair of stack sidewalls extending from the ABS at a first predetermined angle and the back biasing magnet has a pair of magnet sidewalls extending away from the ABS at a second predetermined angle, the first and second angles being different.

6. The magnetic sensor of claim 1, wherein the biasing magnet provides vertical bias to the trilayer stack.

7. The magnetic sensor of claim 1, wherein the biasing magnet comprises a hard magnetic material.

8. The magnetic sensor of claim 7, wherein the hard magnetic material is a cobalt-platinum based alloy or iron-platinum based alloy.

9. The magnetic sensor of claim 1, wherein the back biasing magnet is physically separated from the trilayer stack by an insulating layer.

10. The magnetic sensor of claim 1, wherein the back biasing magnet has a front surface facing a rear surface of the trilayer stack, the rear surface configured to have a greater width, as measured parallel the ABS, than the front surface.

11. The magnetic sensor of claim 1, wherein the back biasing magnet has a front surface facing a rear surface of the trilayer stack, the rear surface configured to have an equal width, as measured parallel the ABS, as the front surface.

12. An apparatus comprising:
a trilayer stack disposed between an air bearing surface (ABS) and a back biasing magnet, the back biasing magnetic magnet and trilayer stack shaped substantially as trapezoids to provide a predetermined C-type micromagnetic magnetization shape in at least one ferromagnetic free layer of the trilayer stack.

13. The apparatus of claim 12, wherein the trilayer stack is disposed between lateral side shields on the ABS.

14. The apparatus of claim 13, wherein the lateral side shields are physically and magnetically isolated from the trilayer stack and back biasing magnet by an insulating layer.

15. The apparatus of claim 13, wherein each lateral side shield has a shield sidewall facing both the trilayer stack and back biasing magnet, the shield sidewall continuously angled from the ABS to match an angle of at least one sidewall of the trilayer stack and back biasing magnet.

16. The apparatus of claim 12, wherein the back biasing magnet provides bias to the trilayer stack in a direction generally perpendicular to the ABS.

17. A magnetic element comprising a trilayer stack disposed between an air bearing surface (ABS) and a back biasing magnet, the back biasing magnet and trilayer stack shaped substantially as trapezoids to provide a predetermined C-type micromagnetic magnetization shape in at least one ferromagnetic free layer of the trilayer stack that resists switching to a predetermined S-type micromagnetic magnetization shape.

18. The magnetic element of claim 17, wherein the predetermined C-type micromagnetic magnetization shape is retained in response to a state of a negative or positive bit.

19. The magnetic element of claim 17, wherein the predetermined C-type micromagnetic magnetization shape is present in each ferromagnetic free layer of the trilayer stack.

20. The magnetic element of claim 19, wherein the predetermined C-type micromagnetic magnetization shape of a first ferromagnetic free layer vectors in an opposite direction from the predetermined C-type micromagnetic magnetization shape of a second ferromagnetic free layer.

\* \* \* \* \*